United States Patent
Iwata et al.

(10) Patent No.: US 7,741,593 B2
(45) Date of Patent: Jun. 22, 2010

(54) PHOTOELECTRIC CONVERSION DEVICE AND IMAGING SYSTEM

(75) Inventors: Koichiro Iwata, Kawasaki (JP);
Hidekazu Takahashi, Zama (JP);
Mahito Shinohara, Machida (JP);
Tetsuya Itano, Zama (JP); Katsuhito Sakurai, Machida (JP); Satoshi Kato, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/360,342

(22) Filed: Jan. 27, 2009

(65) Prior Publication Data
US 2009/0200449 A1 Aug. 13, 2009

(30) Foreign Application Priority Data
Feb. 13, 2008 (JP) ............................. 2008-032350

(51) Int. Cl.
*H01J 40/14* (2006.01)
*H01L 27/00* (2006.01)
*H01L 27/108* (2006.01)
*H04N 3/14* (2006.01)

(52) U.S. Cl. ............................. 250/214 R; 250/208.1; 348/308; 257/308

(58) Field of Classification Search .............. 250/208.1, 250/214 R, 214 A, 214 LA, 214 LS, 214.1, 250/214 AL, 214 B, 214 C; 348/294, 299–304, 348/307–309, 813; 257/204, 207, 208, 239, 257/271, 308, 553, 242, 249–251, 282; 358/445–448, 358/530
See application file for complete search history.

(56) References Cited

U.S. PATENT DOCUMENTS

| 7,126,102 | B2 | 10/2006 | Inoue et al. | .................. 250/214 |
| 7,321,110 | B2 | 1/2008 | Okita et al. | .............. 250/208.1 |
| 7,408,210 | B2 | 8/2008 | Ogura et al. | ................. 257/233 |
| 7,460,162 | B2 | 12/2008 | Koizumi et al. | ............. 348/294 |
| 7,462,810 | B2 | 12/2008 | Kobayashi et al. | ........ 250/208.1 |
| 7,550,793 | B2 | 6/2009 | Itano et al. | ................... 257/239 |
| 2006/0278809 | A1 | 12/2006 | Takayanagi | .............. 250/208.1 |
| 2007/0052831 | A1 | 3/2007 | Ogura et al. | ................. 348/308 |
| 2008/0029793 | A1 | 2/2008 | Watanabe et al. | ........... 257/291 |

(Continued)

FOREIGN PATENT DOCUMENTS

JP 2-094806 A 4/1990

(Continued)

*Primary Examiner*—Georgia Y Epps
*Assistant Examiner*—Don Williams
(74) *Attorney, Agent, or Firm*—Fitzpatrick, Cella, Harper & Scinto

(57) ABSTRACT

A photoelectric conversion device comprises: a clipping unit including a MOS transistor which has a source connected to a signal line and a drain being connected to a power supply, and the clipping unit clipping an electric potential of the signal line to an electric potential corresponding to an electric potential of the source; a holding capacitance which has a first electrode and a second electrode, the first electrode being connected to a gate of the MOS transistor, and the holding capacitance holding at least a voltage transferred to the signal line while the charge-voltage converter has been reset; and a shift unit which shifts an electric potential of the second electrode in a direction such that the electric potential of the second electrode comes close to a level to be transferred to the signal line while the charge-voltage converter has been reset.

19 Claims, 6 Drawing Sheets

U.S. PATENT DOCUMENTS

| | | | |
|---|---|---|---|
| 2008/0030612 A1 | 2/2008 | Itano et al. | 348/340 |
| 2008/0036890 A1 | 2/2008 | Yamashita et al. | 348/308 |
| 2008/0036891 A1* | 2/2008 | Ono et al. | 348/308 |
| 2008/0158403 A1 | 7/2008 | Itano et al. | 348/308 |
| 2009/0015699 A1 | 1/2009 | Watanabe et al. | 348/308 |
| 2009/0122172 A1 | 5/2009 | Iwata et al. | 348/302 |

FOREIGN PATENT DOCUMENTS

| | | |
|---|---|---|
| JP | 2005-057612 A | 3/2005 |
| JP | 2006-352341 A | 12/2006 |

* cited by examiner

PHOTOELECTRIC CONVERSION DEVICE AND IMAGING SYSTEM

BACKGROUND OF THE INVENTION

1. Field of the Invention

The present invention relates to a photoelectric conversion device and imaging system.

2. Description of the Related Art

Recently, photoelectric conversion devices having an amplification function, especially CMOS photoelectric conversion devices, have attracted attention. When very strong light (bright light) such as solar light enters the CMOS photoelectric conversion device, the gray level of the output voltage of a pixel irradiated with the strong light abruptly drops, and the gray level of the pixel may decrease to black level. This phenomenon will be called a high-brightness darkening phenomenon.

The high-brightness darkening phenomenon occurs when performing correlated double sampling (CDS) processing. This phenomenon arises from charges (signal charges) overflowing from a photoelectric conversion unit upon irradiation with strong light during a period in which a noise-level signal is output. More specifically, for example, when reading out a noise-level signal from the detection node (floating diffusion) of a pixel, some of many charges generated in the photoelectric conversion unit (photodiode) leak to the detection node of the pixel. If many charges enter the detection node, a noise-level voltage becomes lower than an (ideal) reset-level voltage and comes close to an optical signal-level voltage. In this case, if an image signal is obtained by CDS processing of calculating the difference between a noise-level voltage and an optical signal-level voltage, the luminance component of the image signal is calculated to be smaller than an original luminance component. This is the mechanism of the high-brightness darkening phenomenon. The above-mentioned voltage relationship assumes that electrons are used as signal charges and an NMOS transistor is used as an amplification MOS transistor for reading out a signal to a signal line. The voltage change direction is reversed when holes are used as signal charges or a PMOS transistor is used as an amplification MOS transistor. The high-brightness darkening phenomenon raises a noise-level voltage.

As a conventional photoelectric conversion device considering the high-brightness darkening phenomenon, a photoelectric conversion device disclosed in Japanese Patent Laid-Open No. 2005-57612 is known. As shown in FIG. 6, the photoelectric conversion device disclosed in Japanese Patent Laid-Open No. 2005-57612 includes a pixel 4, detection unit 2, and second holding means 3.

The detection unit 2 includes a detection means, a first holding means, a feedback means, and a clipping means for clipping an electric potential of a signal line SIG in accordance with a fed-back voltage. The detection means detects an electric potential of the signal line SIG. The first holding means holds a voltage based on the electric potential detected by the detection means. The feedback means feeds back a voltage held by the first holding means to the clipping means. The clipping means clips the electric potential of the signal line SIG in accordance with the fed-back voltage by the feedback means.

In the photoelectric conversion device disclosed in Japanese Patent Laid-Open No. 2005-57612, the electric potential of the signal line SIG that is detected by the detection means is held by the first holding means, and then fed back by the feedback means to the clipping means. For this reason, the difference between the electric potential of the signal line SIG and the input electric potential of the clipping means cannot be arbitrarily set. More specifically, the clipping means is formed from an NMOS transistor. An electric potential (clipping electric potential) clipped by the NMOS transistor is subject to the restriction that the clipping electric potential has to be lower than the electric potential of the signal line SIG by the threshold voltage of the NMOS transistor.

To effectively suppress generation of the high-brightness darkening phenomenon, the clipping electric potential is preferably as close as possible to a reset level which should be transferred via the signal line SIG while the detection node of a pixel is reset. However, in the photoelectric conversion device disclosed in Japanese Patent Laid-Open No. 2005-57612, the clipping electric potential is subject to the restriction that the clipping electric potential has to be lower than the reset level by the threshold voltage of the NMOS transistor. As a result, it becomes difficult to effectively suppress generation of the high-brightness darkening phenomenon.

SUMMARY OF THE INVENTION

It is an aim of the present invention to effectively suppress generation of the high-brightness darkening phenomenon by setting the difference between the reset level and the clipping electric potential to be smaller than the amount of voltage drop in a clipping unit.

According to the first aspect of the present invention, there is provided a photoelectric conversion device in which photoelectric conversion units, charge-voltage converters, transfer units, and output units are two-dimensionally arrayed, each of the charge-voltage converters converting charges into a voltage, each of the transfer units transferring charges generated in the photoelectric conversion unit to the charge-voltage converter, each of the output units outputting, to a signal line, signals corresponding to the voltage converted by the charge-voltage converter, and, in the device, for CDS processing, a first signal being output to the signal line while the charge-voltage converter has been reset, and a second signal being output to the signal line while the transfer unit has transferred charges in the photoelectric conversion unit to the charge-voltage converter, the device comprising: a clipping unit including a MOS transistor which has a source and a drain, one of the source and the drain being connected to the signal line and the other one of the source and the drain being connected to a power supply, and the clipping unit clipping an electric potential of the signal line to an electric potential corresponding to an electric potential of the one; a holding capacitance which has a first electrode and a second electrode, the first electrode being connected to a gate of the MOS transistor, and the holding capacitance holding at least a voltage transferred to the signal line while the charge-voltage converter has been reset; and a shift unit which shifts an electric potential of the second electrode in a direction such that the electric potential of the second electrode comes close to a level to be transferred to the signal line while the charge-voltage converter has been reset.

According to the second aspect of the present invention, there is provided an imaging system comprising: a photoelectric conversion device according to the first aspect of the present invention; an optical system which forms an image on an image sensing plane of the photoelectric conversion device; and a signal processing unit which processes a signal output from the photoelectric conversion device to generate image data.

The present invention can effectively suppress generation of the high-brightness darkening phenomenon by setting the difference between the reset level and the clipping electric potential to be smaller than the amount of voltage drop in a clipping unit.

Further features of the present invention will become apparent from the following description of exemplary embodiments with reference to the attached drawings.

DESCRIPTION OF THE EMBODIMENTS

Figure 1:
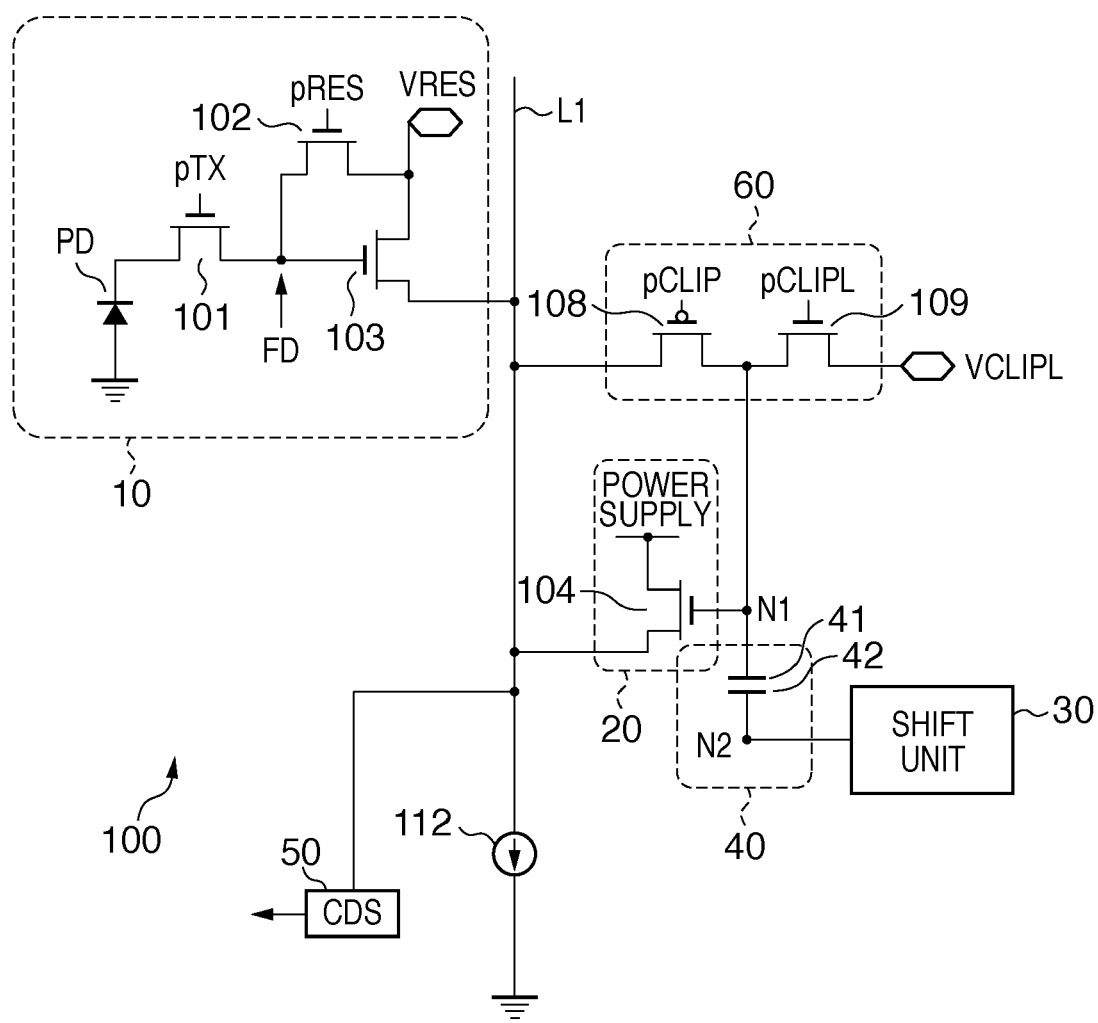
FIG. 1 is a circuit diagram of a photoelectric conversion device 100 according to the first embodiment of the present invention.

A photoelectric conversion device 100 according to the first embodiment of the present invention will be explained with reference to FIG. 1. FIG. 1 is a circuit diagram of the photoelectric conversion device 100 according to the first embodiment of the present invention.

The photoelectric conversion device 100 includes a pixel 10, switch 60, holding capacitance 40, shift unit 30, clipping unit 20, and CDS circuit (difference circuit) 50. The CDS circuit may also be arranged outside the photoelectric conversion device to perform CDS processing outside it.

A plurality of pixels 10 are two-dimensionally (in a row direction and column direction) arrayed in the image sensing region of the photoelectric conversion device 100. Pixels 10 on the same column are connected to a vertical signal line L1.

Each pixel 10 includes a photoelectric conversion unit PD, transfer unit 101, charge-voltage converter FD, amplification transistor (output unit) 103, and reset transistor 102.

The photoelectric conversion unit PD generates charges corresponding to received light. The photoelectric conversion unit PD is, for example, a photodiode. The photoelectric conversion unit PD has an anode grounded, and a cathode connected to the transfer unit 101.

The transfer unit 101 transfers charges generated in the photoelectric conversion unit PD to the charge-voltage converter FD. The transfer unit 101 is, for example, a transfer transistor.

The charge-voltage converter FD converts charges transferred from the transfer unit 101 into a voltage. The charge-voltage converter FD is, for example, a floating diffusion.

The amplification transistor 103 amplifies a signal based on charges transferred to the charge-voltage converter FD, and outputs the amplified signal. The gate of the amplification transistor 103 is electrically connected to the charge-voltage converter FD. The amplification transistor 103 performs a source follower operation in conjunction with a constant current source 112 connected via the vertical signal line L1. The amplification transistor 103 amplifies a signal based on the voltage of the charge-voltage converter FD, and outputs the amplified signal to the vertical signal line L1.

The reset transistor 102 resets the charge-voltage converter FD during a predetermined period. The reset transistor 102 has a drain connected to a power supply VRES, and a source connected to the charge-voltage converter FD. When an active-level driving pulse pRES is supplied to the gate of the reset transistor 102, the reset transistor 102 is turned on to reset the charge-voltage converter FD to an electric potential corresponding to the power supply VRES.

The power supply VRES is either of two electric potentials: an electric potential VRESH to which the charge-voltage converter FD of a readout pixel (pixel from which a signal is to be read out) is reset, and an electric potential VRESL to which the charge-voltage converter FD of a non-readout pixel (pixel from which no signal is to be read out) is reset. By setting VRESH>VRESL, only the amplification transistor 103 of a readout pixel is turned on to supply a current defined by the constant current source 112.

In the following description, the "reset level" means an electric potential which should be output to the vertical signal line L1 while the reset transistor 102 resets the charge-voltage converter FD. To the contrary, the "noise level" (to be described later) means an electric potential actually output to the vertical signal line L1 while the reset transistor 102 resets the charge-voltage converter FD. For example, the noise level is a signal which is output when strong light enters the photoelectric conversion unit, and is a changed first signal a level of which is changed (from the reset level) according to a change of the electric potential of the charge-voltage converter FD while the charge-voltage converter FD has been reset and which is output to the signal line.

The switch 60 applies the voltage of the vertical signal line L1 to the holding capacitance 40 while the charge-voltage converter FD has been reset, and transfers a predetermined electric potential VCLIPL to the holding capacitance 40 while the charge-voltage converter FD has converted charges transferred from the transfer unit 101 into a voltage. VCLIPL is set low as long as the constant current source 112 is not cut off. The switch 60 includes switching transistors 108 and 109. In this case, the switching transistor 108 is formed from a PMOS transistor, and the switching transistor 109 is formed from an NMOS transistor.

When an active-level driving pulse pCLIP is supplied to the gate of the switching transistor 108 while the charge-voltage converter FD has been reset, the switching transistor 108 is turned on. When an inactive-level driving pulse pCLIP is supplied to the gate of the switching transistor 108 while the charge-voltage converter FD has converted charges transferred from the transfer unit 101 into a voltage, the switching transistor 108 is turned off.

When an inactive-level driving pulse pCLIPL is supplied to the gate of the switching transistor 109 while the charge-voltage converter FD has been reset, the switching transistor 109 is turned off. When an active-level driving pulse pCLIP is supplied to the gate of the switching transistor 108 while the charge-voltage converter FD has converted charges transferred from the transfer unit 101 into a voltage, the switching transistor 108 is turned on.

The holding capacitance 40 holds a voltage transferred via the vertical signal line L1 while the charge-voltage converter FD has been reset. The holding capacitance 40 includes a first electrode 41 and second electrode 42. The first electrode 41 is connected to the switch 60. The first electrode 41 receives a voltage transferred via the vertical signal line L1 while the charge-voltage converter FD has been reset, and transfers a predetermined electric potential VCLIPL while the charge-voltage converter FD has converted charges transferred from the transfer unit 101 into a voltage. The second electrode 42 forms a capacitance together with the first electrode 41, and is, for example, an electrode facing the first electrode 41. The second electrode 42 is connected to the shift unit 30.

The shift unit 30 shifts the electric potential of the second electrode 42 in the holding capacitance 40 to make the electric potential of the second electrode 42 come close to the reset level. The direction in which the electric potential comes close to the reset level is the direction of an operation to increase the electric potential of the second electrode 42 when the electric potential rises to come close to the reset level, or the direction of an operation to decrease the electric potential when the electric potential drops to come close to the reset level. The shift unit 30 shifts the electric potential of the second electrode 42 of the holding capacitance 40 in a direction in which the electric potential of the second electrode 42 comes close to the reset level after the voltage of the vertical signal line L1 is transferred to the first electrode 41 via the switch 108. As a result, the shift unit 30 can shift the electric potential of the first electrode 41 of the holding capacitance 40 to make the electric potential of the first electrode 41 come close to the reset level. The amount of shift by the shift unit 30 is equal to or larger than the amount of voltage drop in the clipping unit 20, and equal to or smaller than the difference between a noise-level voltage and a reset-level voltage. More specifically, assume that the first signal is a signal output to the vertical signal line while the charge-voltage converter has been reset. Then, the upper limit of the shift amount is equal to or smaller than the difference between the changed first signal after (upon) a change of the electric potential of the charge-voltage converter, and the unchanged first signal before the change of the electric potential of the charge-voltage converter.

The clipping unit clips an electric potential lower than an electric potential supplied to the gate of an NMOS transistor 104, which will be described later. The shift amount can also be set to reduce the amount of voltage drop. The shift amount is preferably set equal to the amount of voltage drop in the clipping unit.

The clipping unit 20 clips the electric potential of the vertical signal line L1 to a clipping electric potential obtained by subtracting the amount of voltage drop in the clipping unit 20 from the electric potential of the first electrode 41. The clipping unit 20 includes the NMOS transistor 104. The NMOS transistor 104 has a gate connected to the first electrode 41 of the holding capacitance 40, a drain connected to (the side of) the power supply, and a source connected to (the side of) the vertical signal line L1. The NMOS transistor 104 receives the electric potential of the first electrode 41 at the gate, and clips the electric potential of the vertical signal line L1 to a clipping electric potential obtained by subtracting the amount of voltage drop (the gate-source voltage drop including at least the threshold voltage) from the electric potential of the first electrode 41. That is, the NMOS transistor 104 clips the electric potential of the vertical signal line L1 to an electric potential corresponding to that of the source.

Hence, the shift unit 30 preferably shifts the electric potential of the second electrode 42 so that the electric potential of the vertical signal line L1 clipped by the clipping unit 20 comes close to an ideal reset level, that is, the electric potential of the first electrode 41 becomes larger than a value which is smaller by the threshold voltage from an ideal reset level.

As a concrete operation, a level of the first signal may change upon a change of the electric potential of the charge-voltage converter FD while the charge-voltage converter FD has been reset and the changed signal (first signal) is output to the vertical signal line L1. When the difference between the changed first signal (i.e. the electric potential of the vertical signal line L1) and the electric potential of the gate of the MOS transistor 104 exceeds the threshold of the MOS transistor, the NMOS transistor 104 turns on to clip the electric potential of the vertical signal line L1 at a value close to the reset level (larger value than a level which is lower than the reset level by the threshold voltage, and smaller value than the reset level.

It should be noted that the clipping unit 20 may also include a PMOS transistor (not shown), instead of the NMOS transistor 104. In this case, the PMOS transistor has a gate connected to the first electrode 41 of the holding capacitance 40, a source connected to (the side of) the power supply, and a drain connected to (the side of) the vertical signal line L1. The PMOS transistor receives the electric potential of the first electrode 41 at the gate, and clips the electric potential of the vertical signal line L1 to a clipping electric potential obtained by subtracting the amount of voltage drop (between the gate and the source) from the electric potential of the first electrode 41. That is, the PMOS transistor clips the electric potential of the vertical signal line L1 to an electric potential corresponding to that of the drain.

The CDS circuit 50 performs correlated double sampling (CDS) processing to calculate the difference between the noise-level voltage and optical signal-level voltage of a single photoelectric conversion unit, obtaining an image signal free from the noise component. More specifically, the CDS circuit 50 outputs the first signal to the signal line while the charge-voltage converter has been reset, and outputs the second signal to the signal line while the transfer unit has transferred the charges of the photoelectric conversion unit to the charge-voltage converter. Then, the CDS circuit 50 calculates the difference between the two signals. This is CDS processing. The CDS circuit 50 outputs the obtained image signal to the output stage (e.g., a sensed image signal processing circuit 95 shown in FIG. 4).

Figure 3:
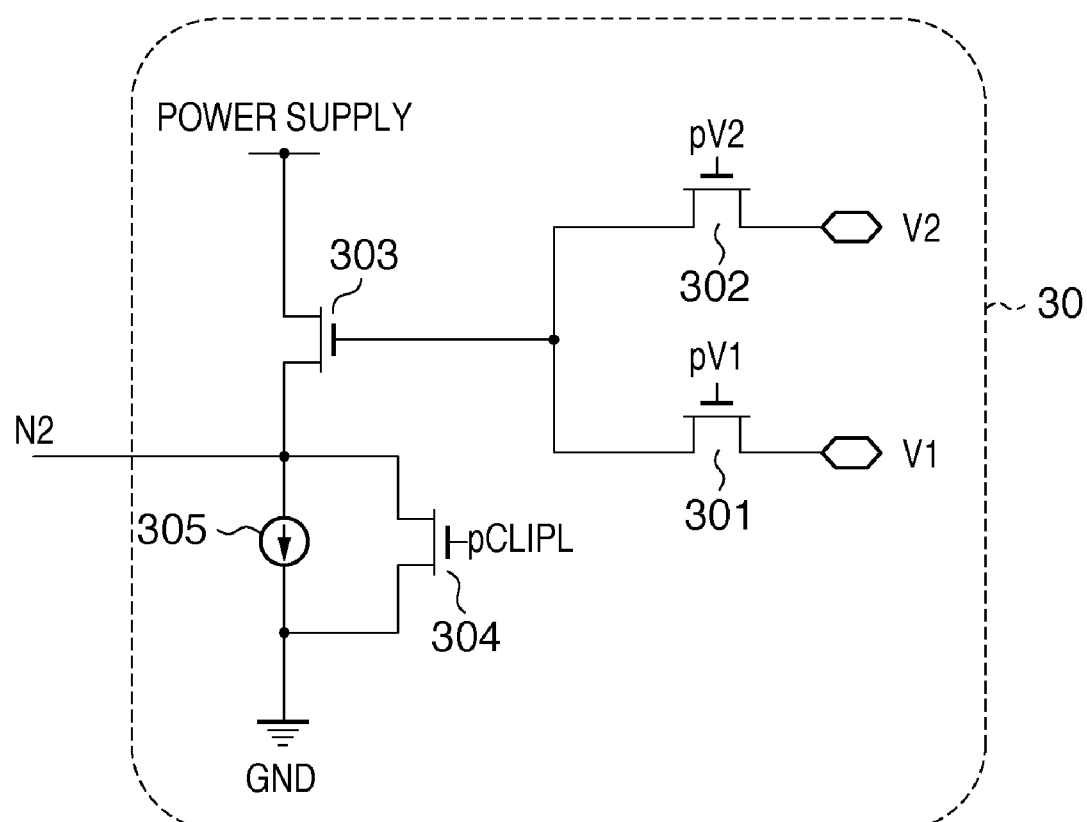
FIG. 3 is a circuit diagram of a shift unit 30.

The arrangement of the shift unit 30 will be explained with reference to FIG. 3. FIG. 3 is a circuit diagram of the shift unit 30.

The shift unit 30 includes a switching transistor 301, switching transistor 302, source follower (SF) transistor 303, constant current source 305, and switching transistor 304. All the switching transistor 301, switching transistor 302, SF transistor 303, and switching transistor 304 are NMOS transistors.

When a driving pulse pV1 is high, the switching transistor 301 applies "electric potential V1+the threshold voltage of the SF transistor 303" to the gate of the SF transistor 303. The SF transistor 303 performs a source follower operation in conjunction with the constant current source 305, and applies a voltage of the electric potential V1 to a node N2. At this time, both the switching transistors 302 and 304 are OFF.

When a driving pulse pV2 is high, the switching transistor 302 applies "electric potential V2+the threshold voltage of the SF transistor 303" to the gate of the SF transistor 303. The SF transistor 303 performs a source follower operation in conjunction with the constant current source 305, and applies a voltage of the electric potential V2 (>V1) to the node N2. At this time, both the switching transistors 301 and 304 are OFF.

When a driving pulse pCLIPL is high, the switching transistor 304 is turned on to apply a voltage of the GND electric potential to the node N2. At this time, all the switching transistors 301 and 302, and SF transistors 303 are OFF.

Figure 2:
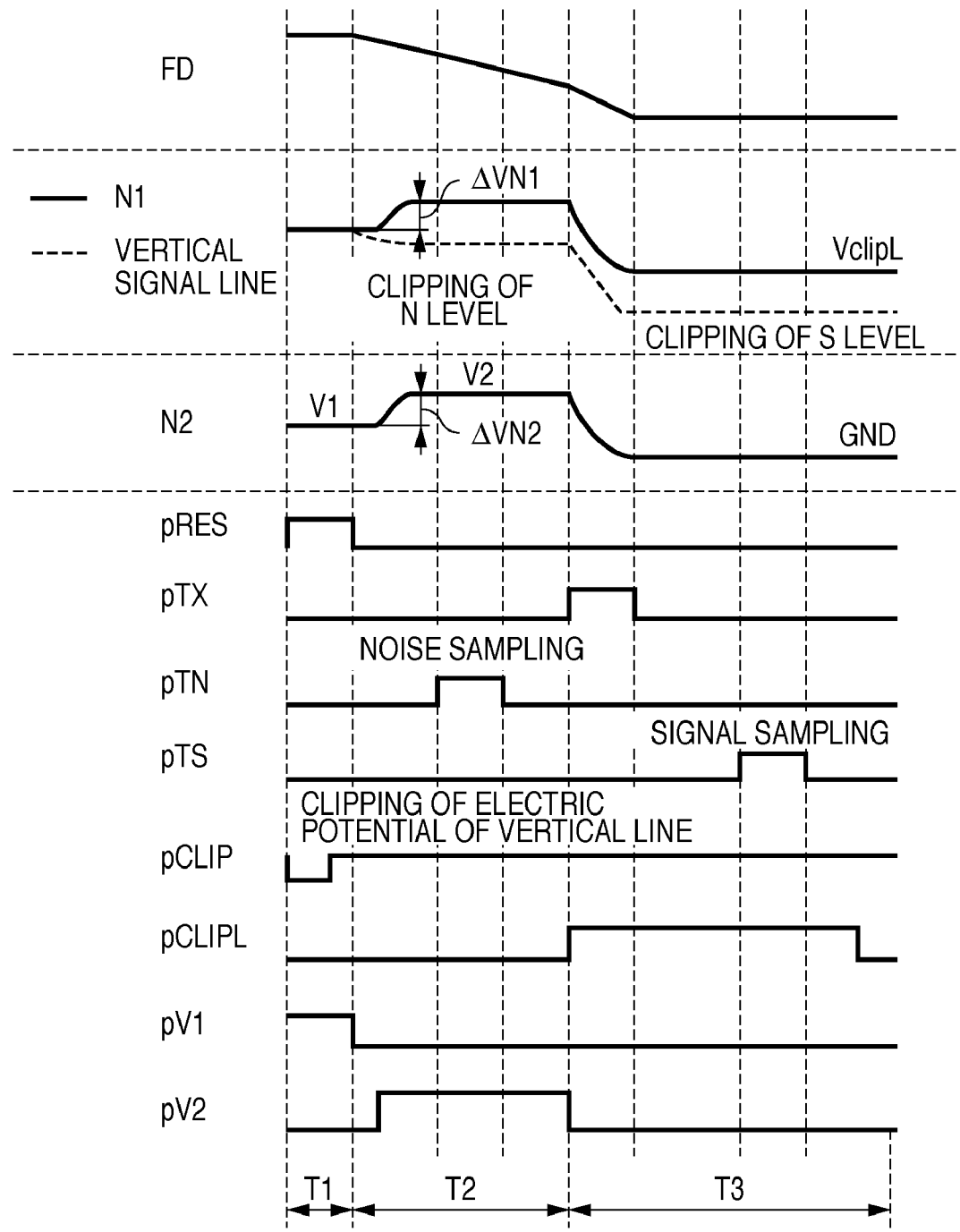
FIG. 2 is a timing chart showing the operation of the photoelectric conversion device 100.

The operation of the photoelectric conversion device 100 will be explained with reference to FIG. 2. FIG. 2 is a timing chart showing the operation of the photoelectric conversion device 100. In FIG. 2, "FD" to "N2" represent the electric potentials of respective nodes. "pRES" to "pV2" represent driving pulses.

A normal operation will be explained.

In a period T1, the driving pulse pRES is applied to the reset transistor 102 to reset the charge-voltage converter FD of a readout pixel to the reset electric potential VRESH. The driving pulse pCLIP is applied to the switching transistor 108 to turn it on.

A reset-level voltage which should be transferred via the vertical signal line L1 while the charge-voltage converter FD has been reset is given by $$VL1res = VRESH - Vth0 \text{ (threshold voltage of the reset transistor 102)} - Vth1 \text{ (threshold voltage of the amplification transistor 103)} - \Delta ov1 \text{ (over-drive voltage of the amplification transistor 103)} \quad (1)$$

where $\Delta ov1$ is a voltage determined by the characteristic of the amplification transistor 103 and the current value of the constant current source 112.

The holding capacitance 40 holds a noise-level voltage transferred via the vertical signal line L1 while the charge-voltage converter FD has been reset. Then, the electric potential of a node N1 becomes equal to a noise level transferred via the vertical signal line L1. When the noise level is equal to the reset level, the electric potential of the node N1 becomes equal to the reset level.

In the period T1, the electric potential of the node N2 is fixed to an arbitrary electric potential V1. The node N1 is connected to the gate of the NMOS transistor 104, and the voltage held by the holding capacitance 40 is fed back to the gate of the NMOS transistor 104.

In a period T2, the electric potential of the node N2 rises from V1 to an arbitrary electric potential V2. The rise of the electric potential of the node N2 is $$\Delta VN2 = V2 - V1 \quad (2)$$

As the electric potential of the node N2 rises, the electric potential of the node N1 also rises. The rise of the electric potential of the node N1 is $$\Delta VN1 = K \times \Delta VN2 \quad (3)$$

where K is a constant of proportionality. As a result, the electric potential VN1 of the node N1 becomes $$VN1 = VRESH - Vth0 - Vth1 - \Delta ov1 + VN1 \quad (4)$$

In the period T2, the CDS circuit 50 receives an active driving signal pTN to hold a noise-level voltage transferred via the vertical signal line L1 and sample the noise level of the pixel.

In period T3, the pulse pCLIPL is applied to the switching transistor 109 to turn it on and rewrite the electric potential of the node N1 to the electric potential VCLIPL in order to sample the optical signal level of the pixel. VCLIPL is set low as long as the constant current source 112 is not cut off. At this time, the electric potential of the vertical signal line is clipped not to become lower than VCLIPL−Vth2−Δov2. The electric potential of the node N2 is reset to the GND electric potential in order to read out the next pixel output after the end of sampling the signal level.

An operation in the period T2 when strong light like solar light enters the pixel 10 will be explained.

When strong light such as solar light enters the pixel 10, the electric potential of the charge-voltage converter FD decreases owing to charges overflowing from the photoelectric conversion unit PD. In response to this, a noise level transferred via the vertical signal line L1 also drops from the reset level.

Assume that the shift unit 30 does not shift the electric potential of the second electrode 42 of the holding capacitance 40. In this case, the NMOS transistor 104 directly receives at the gate the electric potential of the vertical signal line L1 that is input from the switch 60, and clips the electric potential of the vertical signal line L1 to a clipping electric potential Vclip:

$$Vclip = VRESH - Vth0 - Vth1 \Delta ov1 - Vth2 \text{ (threshold voltage of the NMOS transistor 104)} - \Delta ov2 \text{ (over-drive voltage of the NMOS transistor 104)} \quad (5)$$

That is, the level of the clipping electric potential Vclip becomes lower than the reset level by $$VL1res - VclipH = Vth2 + \Delta ov2 \quad (6)$$

As represented by equation (6), the difference between the reset level and the clipping electric potential is equal to or larger than the amount Vth2 of voltage drop in the clipping unit. It is difficult to make the difference between the reset level and the clipping electric potential smaller than the amount of voltage drop in the clipping unit.

To the contrary, in the first embodiment, the shift unit 30 shifts the electric potential of the second electrode 42 of the holding capacitance 40 by ΔVN2 (see equation (2)). In this case, the NMOS transistor 104 receives at the gate an electric potential shifted from that of the vertical signal line L1 by ΔVN1 (see equation (3)). The NMOS transistor 104 clips the electric potential of the vertical signal line L1 to a clipping electric potential VclipH:

$$VclipH = VRESH - Vth0 - Vth1 - \Delta ov1 + \Delta VN1 - Vth2 \text{ (threshold voltage of the NMOS transistor 104)} - \Delta ov2 \text{ (over-drive voltage of the NMOS transistor 104)} \quad (7)$$

That is, the level of the clipping electric potential VclipH becomes lower than the reset level by $$VL1res - VclipH = (Vth2 + \Delta ov2) - \Delta VN1 \quad (8)$$

As represented by equation (8), if an electric potential shifted by ΔVN1 which satisfies $$0 \leq (Vth2 + \Delta ov2) - \Delta VN1 < Vth2 \quad (9)$$

that is, $$\Delta ov2 < \Delta VN1 \leq Vth2 + \Delta ov2 \quad (10)$$

is input to the gate of the NMOS transistor 104, the difference between the reset level and the clipping electric potential can be made smaller than the amount of voltage drop in the clipping unit.

In other words, from equation (3) and equation (10), if the shift unit 30 shifts the electric potential of the second electrode 42 of the holding capacitance 40 by ΔVN2 which satisfies $$\Delta ov2/K < \Delta VN2 \leq (Vth2 + \Delta ov2)/K \quad (11)$$

the difference between the reset level and the clipping electric potential can be made smaller than the amount of voltage drop in the clipping unit.

As described above, according to the first embodiment, by setting the difference between the reset level and the clipping electric potential to be smaller than the amount of voltage drop in the clipping unit, generation of the high-brightness darkening phenomenon can be effectively suppressed.

According to the first embodiment, because the electric potential of the vertical signal line L1 is (shifted and) fed back to the gate of the NMOS transistor 104, the influence of variations of the pixel characteristic (fluctuations of the threshold voltage) on the clipping electric potential can be suppressed.

Figure 4:
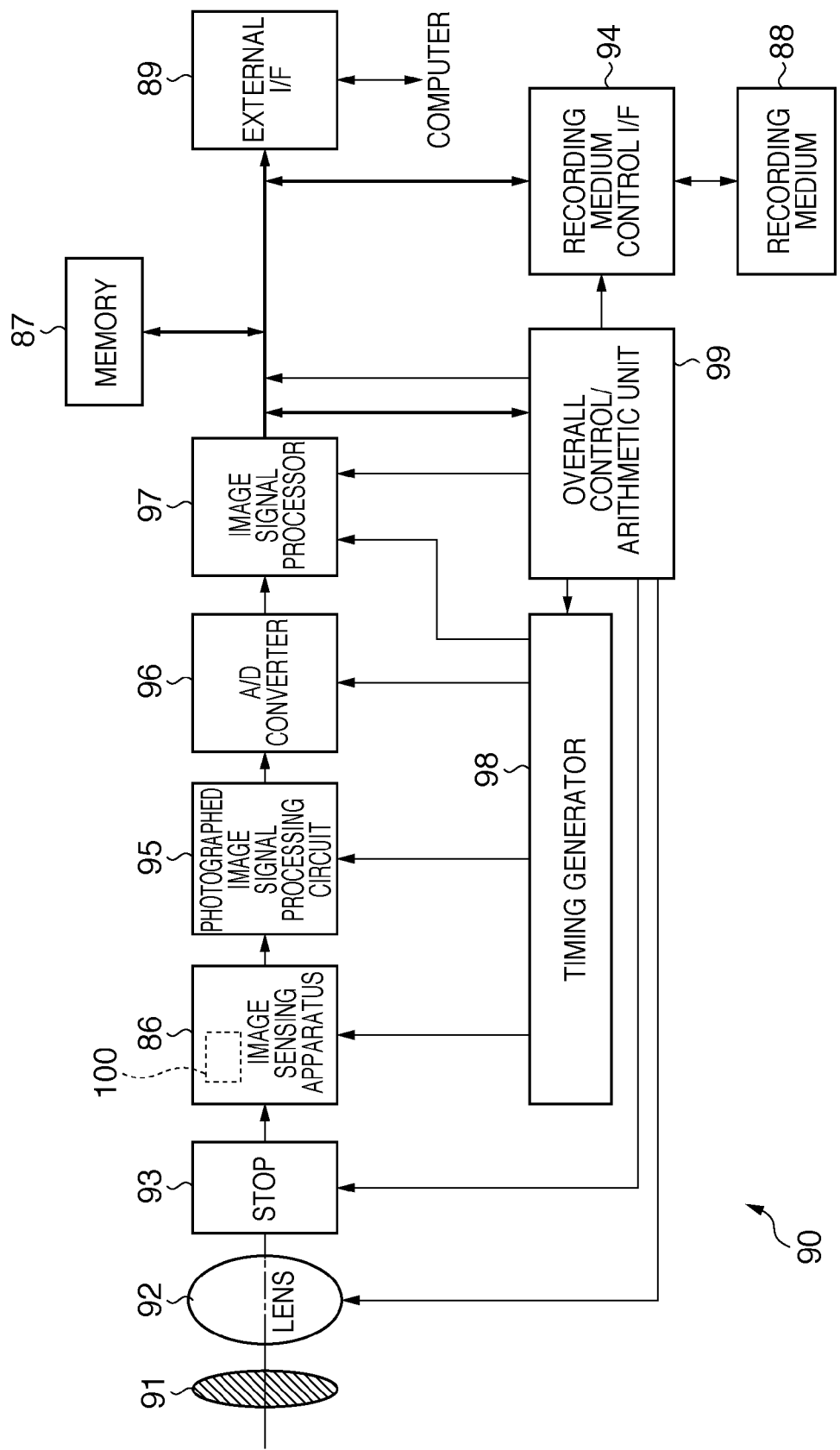
FIG. 4 is a block diagram of an imaging system to which the photoelectric conversion device according to the first embodiment is applied.

FIG. 4 shows an example of an imaging system to which the photoelectric conversion device according to the present invention is applied.

As shown in FIG. 4, an imaging system 90 mainly includes an optical system, image sensing apparatus 86, and signal processing unit. The optical system mainly includes a shutter 91, lens 92, and stop 93. The image sensing apparatus 86 includes the photoelectric conversion device 100. The signal processing unit mainly includes a sensed image signal processing circuit 95, A/D converter 96, image signal processor 97, memory 87, external I/F 89, timing generator 98, overall control/arithmetic unit 99, recording medium 88, and recording medium control I/F 94. The signal processing unit may not include the recording medium 88.

The shutter 91 is arranged in front of the lens 92 on the optical path to control the exposure.

The lens 92 refracts incident light to form an object image on the image sensing plane of the photoelectric conversion device 100 in the image sensing apparatus 86.

The stop 93 is interposed between the lens 92 and the photoelectric conversion device 100 on the optical path. The stop 93 adjusts the quantity of light guided to the photoelectric conversion device 100 after passing through the lens 92.

The photoelectric conversion device 100 of the image sensing apparatus 86 converts an object image formed on the image sensing plane (pixel array) into an image signal. The image sensing apparatus 86 reads out the image signal from the photoelectric conversion device 100, and outputs it.

The sensed image signal processing circuit 95 is connected to the image sensing apparatus 86, and processes an image signal output from the image sensing apparatus 86.

The A/D converter 96 is connected to the sensed image signal processing circuit 95. The A/D converter 96 converts a processed image signal (analog signal) output from the sensed image signal processing circuit 95 into an image signal (digital signal).

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., a personal computer) via the external I/F 89.

The timing generator 98 is connected to the image sensing apparatus 86, sensed image signal processing circuit 95, A/D converter 96, and image signal processor 97. The timing generator 98 supplies timing signals to the image sensing apparatus 86, sensed image signal processing circuit 95, A/D converter 96, and image signal processor 97. The image sensing apparatus 86, sensed image signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. Image data output from the image signal processor 97 is recorded on the recording medium 88 via the recording medium control I/F 94.

With this arrangement, the photoelectric conversion device 100 can provide a high-quality image (image data) as long as it can obtain a high-quality image signal.

Figure 5:
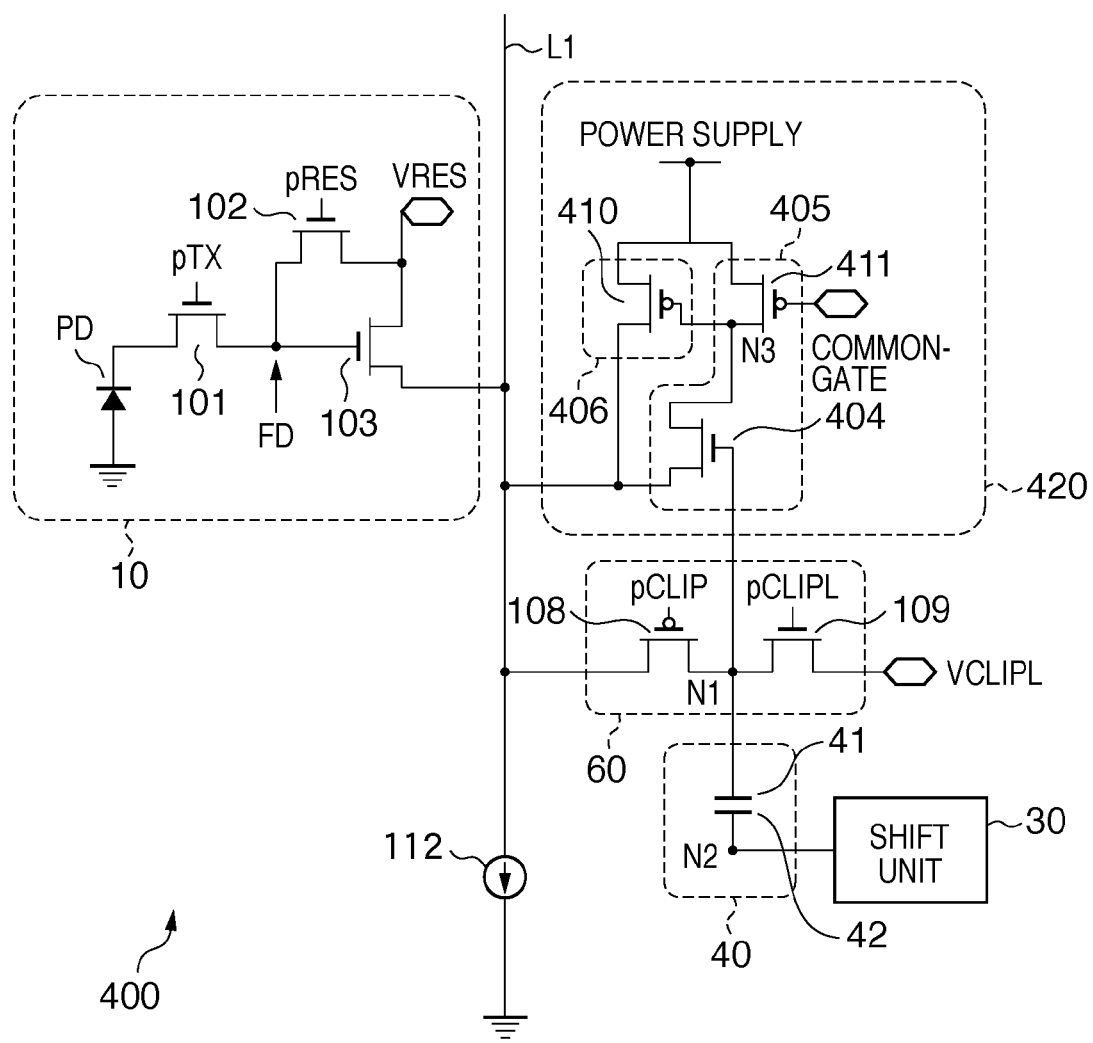
FIG. 5 is a circuit diagram of a photoelectric conversion device 400 according to the second embodiment of the present invention.
Figure 6:
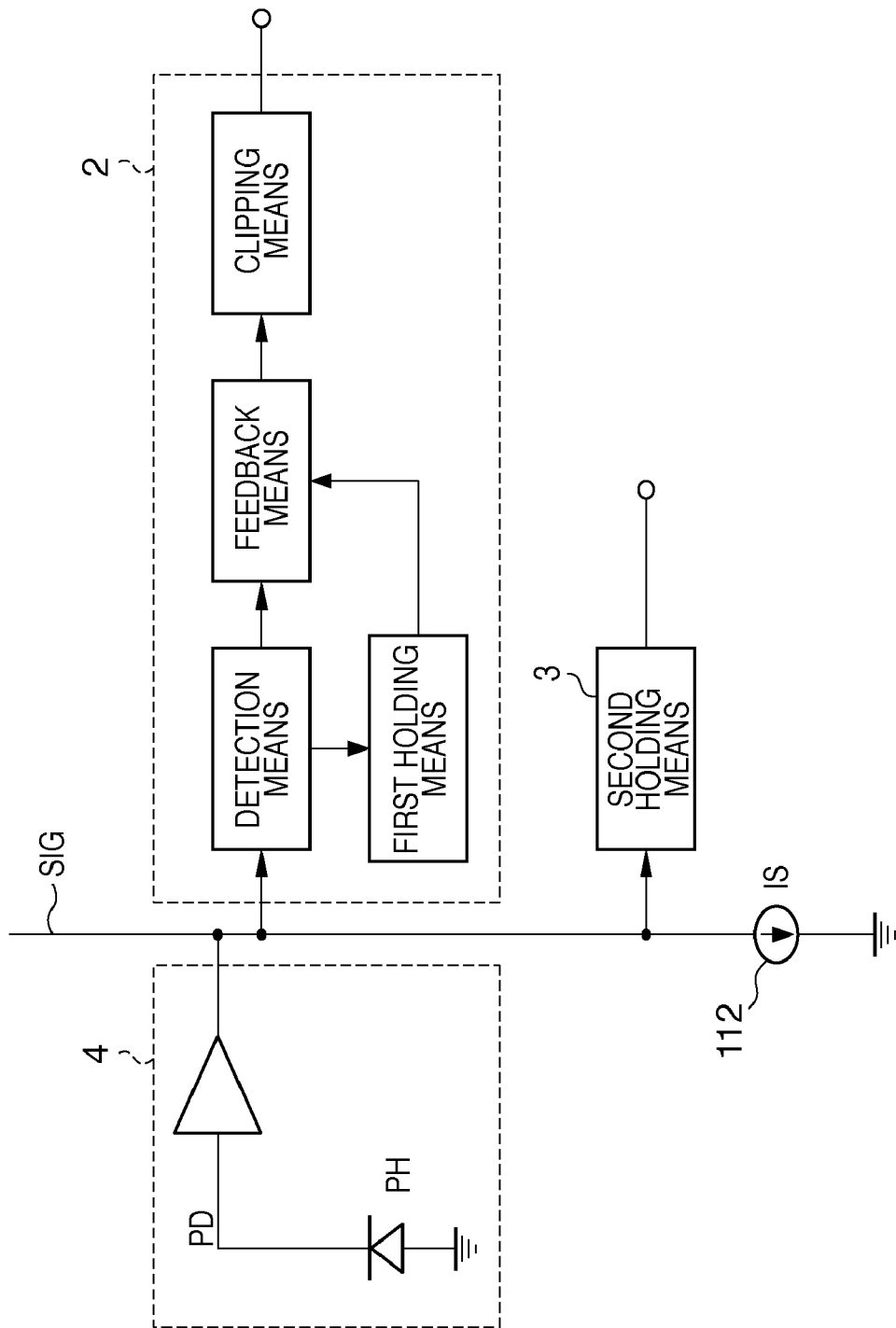
FIG. 6 is a diagram for explaining a prior art.

A photoelectric conversion device 400 according to the second embodiment of the present invention will be explained with reference to FIG. 5. FIG. 5 is a circuit diagram of the photoelectric conversion device 400 according to the second embodiment of the present invention. A difference from the first embodiment will be mainly explained.

The photoelectric conversion device 400 includes a clipping unit 420. The clipping unit 420 includes a common-gate amplification circuit 405, and a clipping transistor 406 which forms part of a common-source amplification circuit (i.e. the constant current source 112 forms another part of the common-source amplification circuit).

For example, the common-gate amplification circuit 405 and clipping transistor 406 can take an arrangement as shown in FIG. 5.

The common-gate amplification circuit 405 includes a constant current source 411 and NMOS transistor 404. The clipping transistor 406 includes a PMOS transistor 410 having a common-source (source connected to a fixed electric potential). The clipping transistor 406 forms a common-source amplification circuit together with a constant current source 112 on a vertical signal line L1.

The constant current source 411 is formed from a PMOS transistor having a common-gate (gate connected to a fixed electric potential (e.g., GND)), a source connected to a power supply, and a drain connected to the NMOS transistor 404 and the PMOS transistor 410 in the common-source amplification circuit. The constant current source 411 functions as a current source load for supplying a constant current to the NMOS transistor 404.

The NMOS transistor 404 has a gate connected to the first electrode 41 of the holding capacitance 40, and a source connected to the vertical signal line L1. The NMOS transistor 404 has a drain connected to the constant current source 411 and the gate of the clipping transistor 406 (PMOS transistor 410). The NMOS transistor 404 amplifies a drop of the electric potential of the vertical signal line L1 (source) from a voltage (clipping electric potential) supplied to the gate. The NMOS transistor 404 outputs the amplified voltage from the drain.

The gate of the clipping MOS transistor 406 (PMOS transistor 410) receives an output from the common-gate amplification circuit 405, and is connected to the drain of the NMOS transistor 404. The clipping MOS transistor 406 (PMOS transistor 410) is formed from a PMOS transistor having a source connected to a power supply, and a drain connected to the source of the NMOS transistor 404 and the vertical signal line L1. The PMOS transistor 410 in the common-source amplification circuit receives the output voltage of the drain of the NMOS transistor 404. When the drop of the electric potential of the vertical signal line L1 from the clipping electric potential VclipH is large, the clipping MOS transistor 406 feeds back, to the source of the NMOS transistor 404, a higher voltage than that when the drop is small. This feedback is negative feedback.

When the drop of the electric potential of the vertical signal line L1 from the clipping electric potential VclipH is large, the NMOS transistor 404 receives at the source a higher voltage fed back from the clipping MOS transistor 406 than that when the drop is small. This arrangement can achieve the following clipping operation.

When the electric potential of the vertical signal line L1 drops to turn on the NMOS transistor 404, the electric potential of a node N3 drops to turn on the clipping MOS transistor 406. The gate of the clipping MOS transistor 406 receives an electric potential amplified by a positive gain factor with respect to a change of the electric potential of the vertical signal line L1. Then, the drain current of the clipping MOS transistor 406 (PMOS transistor 410) abruptly increases as the electric potential of the vertical signal line L1 drops. When the drop of the electric potential of the vertical signal line L1 from the clipping electric potential VclipH is large, the clipping MOS transistor 406 (PMOS transistor 410) feeds back, to the source of the NMOS transistor 404, a higher voltage than that when the drop is small. When the sum of currents flowing through the current source load 411 and common-source amplification circuit 410 equals the value of a current flowing through the constant current source 112 on the vertical signal line L1, the electric potential of the vertical signal line L1 stabilizes.

It is preferable for an efficient clipping operation to set the value of a current flowing through the PMOS transistor 411 serving as the current source load of the NMOS transistor 404 to be smaller than a current flowing through the constant current source 112, and increase the gain of the common-gate amplification circuit 405.

For the same reason, the transconductance of the common-source amplification circuit including the clipping MOS transistor 406 is preferably set larger than the constant current source 411 and NMOS transistor 404.

Assume that the current value of the common-gate amplification circuit 405 is 1/M of the constant current source 112 on the vertical signal line L1, and the current value of the constant current source 112 on the vertical signal line L1 is I1. In this case, M is 1<M.

The electric potential of the vertical signal line L1 drops, and the electric potential of the source of the NMOS transistor 404 drops to turn on the NMOS transistor 404 and supply a drain current. At this time, the NMOS transistor 404 can supply only 1/M of the current of the constant current source 112 on the vertical signal line L1. Hence, as Vgs (a voltage between the gate and the source of the NMOS transistor 404) rises, the electric potential of the drain (node N3) of the NMOS transistor 404 abruptly drops. Upon the abrupt drop of the electric potential of the node N3, the common-source amplification circuit (PMOS transistor) 410 is turned on to abruptly increase the drain current of the PMOS transistor 410 in the common-source amplification circuit.

Finally, when the value of a current flowing through the NMOS transistor 404 becomes I1×1/M and a current flowing through the common-source amplification circuit including the clipping MOS transistor 406 becomes I1×(M−1)/M, the clipping unit (clipping circuit) 420 stabilizes.

Assume that the transconductance of the clipping MOS transistor 406 is much larger than the constant current source 411 and NMOS transistor 404. Also, assume that the constant current source 411 and NMOS transistor 404 operate in the saturation region when clipping the electric potential of the vertical signal line L1.

As described above, the clipping electric potential of the vertical signal line L1 is given by VRESH−Vth0−Vth1−Δov1+ΔVN2−Vth4 (threshold voltage of the NMOS transistor 404)−Δov4 (over-drive voltage of the NMOS transistor 404). Hence, the clipping electric potential of the vertical signal line L1 is lower than the reset level by (−ΔVN2+Vth4+Δov4).

As described above, in the second embodiment, the value of a current supplied from the NMOS transistor 404 is 1/M of the value of a current supplied from the constant current source 112 on the vertical signal line L1, so the over-drive voltage Δov4 can be reduced. When the noise level of the vertical signal line L1 drops, the clipping electric potential of the vertical signal line L1 can be set high to ensure the dynamic range of the vertical signal line L1.

The present invention is not limited to the above-described embodiments, and the embodiments can be properly modified and combined without departing from the scope of the invention.

For example, in the embodiments, electrons are used as signal charges, and an NMOS transistor is used as an amplification transistor. It is also possible to use holes as signal charges, and a PMOS transistor as an amplification transistor. In this case, a darkening phenomenon raises a noise-level voltage of the vertical signal line, so the clipping operation is executed to prevent the voltage from exceeding a predetermined value. In this case, a PMOS transistor is available as a clipping transistor. The level shift amount is also properly adjusted in accordance with the PMOS transistor.

The pixel arrangement is exemplified to switch the gate electric potential of the amplification transistor (electric potential of the charge-voltage converter FD). A selection MOS transistor may also be arranged on the source or drain side of the amplification MOS transistor to select/deselect the pixel and to control a current flowing through the amplification MOS transistor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-032350, filed Feb. 13, 2008, which is hereby incorporated by reference herein in its entirety.

What is claimed is:

1. A photoelectric conversion device in which photoelectric conversion units, charge-voltage converters, transfer units, and output units are two-dimensionally arrayed, each of the charge-voltage converters converting charges into a voltage, each of the transfer units transferring charges generated in the photoelectric conversion unit to the charge-voltage converter, each of the output units outputting, to a signal line, signals corresponding to the voltage converted by the charge-voltage converter, and, in the device, for CDS processing, a first signal being output to the signal line while the charge-voltage converter has been reset, and a second signal being output to the signal line while the transfer unit has transferred charges in the photoelectric conversion unit to the charge-voltage converter, the device comprising:

a clipping unit including a MOS transistor with a source and a drain, one of the source and the drain being connected to the signal line, and the other one of the source and the drain being connected to a power supply, and the clipping unit clipping an electric potential of the signal line to an electric potential corresponding to an electric potential of the one;

a holding capacitance device, which includes a first electrode and a second electrode, the first electrode being connected to a gate of the MOS transistor, and the holding capacitance device holding at least a voltage transferred to the signal line while the charge-voltage converter has been reset; and a shift unit, which shifts an electric potential of the second electrode in a direction such that the electric potential of the second electrode comes close to a level to be transferred to the signal line while the charge-voltage converter has been reset.

2. The device according to claim 1, wherein the MOS transistor clips the electric potential of the signal line to a clipping electric potential obtained by subtracting an amount of voltage drop in the clipping unit from an electric potential of the first electrode.

3. The device according to claim 2, wherein a shift amount by the shift unit is equal to or not smaller than an amount of voltage drop in the clipping unit, and is equal to or not larger than a difference between the changed first signal upon a change of an electric potential of the charge-voltage convener, and the unchanged first signal before the change of the electric potential of the charge-voltage converter.

4. The device according to claim 1, wherein, when a level of the first signal changes upon a change of an electric potential of the charge-voltage converter while the first signal is output, if a difference between the changed level of the first signal and an electric potential of the gate of the MOS transistor exceeds a threshold of the MOS transistor, the MOS transistor clips the electric potential of the signal line.

5. The device according to claim 1, further comprising a switch, which supplies a voltage of the signal line to the first electrode of the holding capacitance, wherein the shift unit shifts the electric potential of the second electrode of the holding capacitance after the voltage of the signal line is supplied to the first electrode via the switch.

6. The device according to claim 1, wherein an amount of voltage drop in the clipping unit is at least equal to or not smaller than a threshold voltage of the MOS transistor.

7. The device according to claim 1, wherein the MOS transistor includes an NMOS transistor with a drain connected to the power supply, and with a source connected to the signal line.

8. The device according to claim 1, wherein the clipping unit further includes:
 an NMOS transistor with a source connected to the signal line,
 a constant current source interposed between the drain of the NMOS transistor and the power supply, and
 a PMOS transistor, which receives at a gate a voltage of the drain of the NMOS transistor, the PMOS transistor including a drain arranged on a source side of the NMOS transistor and including a source arranged on a side of the power supply.

9. The device according to claim 8, wherein the PMOS transistor includes a gate connected to the drain of the NMOS transistor, a source connected to the power supply, and a drain connected to the source of the NMOS transistor.

10. The device according to claim 1, wherein the MOS transistor includes a PMOS transistor with a source connected to the power supply, and with a drain connected to the signal line.

11. A photoelectric conversion device according to claim 1, wherein the photoelectric conversion device is incorporated in an imaging system that includes:
 an optical system, which forms an image on an image sensing plane of the photoelectric conversion device; and a signal processing unit, which processes a signal output from the photoelectric conversion device to generate image data.

12. A photoelectric conversion device in which photoelectric conversion units, charge-voltage converters, transfer units, and output units are two-dimensionally arrayed, each of the charge-voltage converters converting charges into a voltage, each of the transfer units transferring charges generated in the photoelectric conversion unit to the charge-voltage converter, each of the output units outputting, to a signal line, signals corresponding to the voltage converted by the charge-voltage converter, and, in the device, for CDS processing, a first signal being output to the signal line while the charge-voltage converter has been reset, and a second signal being output to the signal line while the transfer unit has transferred charges in the photoelectric conversion unit to the charge-voltage converter, the device comprising:

a clipping unit including a MOS transistor with a source and a drain, one of the source and the drain being connected to the signal line and the other one of the source and the drain being connected to a power supply, and the clipping unit clipping an electric potential of the signal line to an electric potential corresponding to an electric potential of the one;

a holding capacitance, which includes a first electrode and a second electrode, the first electrode being connected to a gate of the MOS transistor, and the holding capacitance holding at least a voltage transferred to the signal line while the charge-voltage converter has been reset;

a shift unit, which shifts an electric potential of the second electrode in a direction such that the electric potential of the second electrode comes close to a level to be transferred to the signal line while the charge-voltage converter has been reset; and a switch, which supplies a voltage on the signal line to the first electrode of the holding capacitance in a period during which the first signal is output to the signal line, and supplies a predetermined voltage to the first electrode of the holding capacitance in a period during which the second signal is output to the signal line.

13. The device according to claim 12, wherein the MOS transistor clips the electric potential of the signal line to a clipping electric potential obtained by subtracting an amount of voltage drop in the clipping unit from an electric potential of the first electrode.

14. The device according to claim 12, wherein, when a level of the first signal changes upon a change of an electric potential of the charge-voltage converter while the first signal is output, if a difference between the changed level of the first signal and an electric potential of the gate of the MOS transistor exceeds a threshold of the MOS transistor, the MOS transistor clips the electric potential of the signal line.

15. The device according to claim 14, wherein a shift amount by the shift unit is equal to or not smaller than an amount of voltage drop in the clipping unit, and is equal to or not larger than a difference between the changed first signal upon a change of an electric potential of the charge-voltage converter and the unchanged first signal before the change of the electric potential of the charge-voltage converter.

16. The device according to claim 12, wherein an amount of voltage drop in the clipping unit is at least equal to or not smaller than a threshold voltage of the MOS transistor.

17. The device according to claim 12, wherein the MOS transistor includes an NMOS transistor having a drain connected to the power supply and a source connected to the signal line.

18. The device according to claim 12, wherein the MOS transistor includes a PMOS transistor with a source connected to the power supply, and with a drain connected to the signal line.

19. A photoelectric conversion device according to claim 12, wherein the photoelectric conversion device is incorporated in an imaging system that includes:

an optical system, which forms an image on an image sensing plane of the photoelectric conversion device; and a signal processing unit, which processes a signal output from the photoelectric conversion device to generate image data.

\* \* \* \* \*